United States Patent
Fostick et al.

(10) Patent No.: US 7,493,269 B2
(45) Date of Patent: Feb. 17, 2009

(54) METHOD AND SYSTEM FOR ENABLING THE DISPENSING AND REDEEMING OF VOUCHERS BY VOICEMAIL

(75) Inventors: Gideon Fostick, Givat Shmuel (IL); Gideon Beery, Shoham (IL); Benjie Bloch, Rosh HaAyin (IL)

(73) Assignee: Comverse Ltd., Tel Aviv (IL)

( * ) Notice: Subject to any disclaimer, the term of this patent is extended or adjusted under 35 U.S.C. 154(b) by 1347 days.

(21) Appl. No.: 09/984,382

(22) Filed: Oct. 30, 2001

(65) Prior Publication Data

US 2003/0083934 A1 May 1, 2003

(51) Int. Cl.
*G06Q 30/00* (2006.01)

(52) U.S. Cl. ............................. 705/14; 705/26; 705/27; 235/380; 235/381; 235/382; 235/383; 455/38

(58) Field of Classification Search ................ 705/14, 705/26, 27; 235/380, 381, 382, 383; 455/38
See application file for complete search history.

(56) References Cited

U.S. PATENT DOCUMENTS

| | | | | | |
|---|---|---|---|---|---|
| 5,192,854 | A | * | 3/1993 | Counts | 235/375 |
| 5,870,030 | A | * | 2/1999 | DeLuca et al. | 340/7.48 |
| 6,332,127 | B1 | * | 12/2001 | Bandera et al. | 705/14 |
| 6,450,407 | B1 | * | 9/2002 | Freeman et al. | 235/492 |
| 6,467,686 | B1 | * | 10/2002 | Guthrie et al. | 235/383 |
| 6,505,773 | B1 | * | 1/2003 | Palmer et al. | 235/380 |
| 7,343,317 | B2 | * | 3/2008 | Jokinen et al. | 705/14 |
| 2001/0039514 | A1 | * | 11/2001 | Barenbaum et al. | 705/14 |
| 2002/0035474 | A1 | * | 3/2002 | Alpdemir | 704/270 |
| 2002/0060246 | A1 | * | 5/2002 | Gobburu et al. | 235/462.46 |
| 2002/0091566 | A1 | * | 7/2002 | Siegel | 705/14 |
| 2002/0095333 | A1 | * | 7/2002 | Jokinen et al. | 705/14 |
| 2003/0004802 | A1 | * | 1/2003 | Callegari | 705/14 |
| 2004/0158492 | A1 | * | 8/2004 | Lopez et al. | 705/14 |

FOREIGN PATENT DOCUMENTS

| | | | |
|---|---|---|---|
| WO | WO 9819229 A1 | * | 5/1998 |
| WO | WO 00/67210 A1 | | 11/2000 |

OTHER PUBLICATIONS

"AdForce and MetaTV Join Forces to Deliver Advertising Infrastructure for Interactive Television Portals-Joint Offering Allows Cable Operators to Generate Advertising Revenue Through Their Custom-Branded iTV Portals." Business Wire: Tuesday, Oct. 3, 2000.*

* cited by examiner

*Primary Examiner*—Jean Janvier
(74) *Attorney, Agent, or Firm*—Sughrue Mion, PLLC

(57) ABSTRACT

A system for providing voucher dispensing and redeeming using current mobile communications hardware and infrastructure. The system enables the creation, reception and usage of voice vouchers, wherein digital vouchers are embodied as attachments within voicemail messages. In this way, the system enables the transfer and interaction with online vouchers using existing voicemail systems, such that the content and authentication data of a voucher may be received and redeemed using a standard mobile communications device. Furthermore the voucher may be verified and controlled by a voucher vendor, by using a specialized voucher server.

8 Claims, 3 Drawing Sheets

METHOD AND SYSTEM FOR ENABLING THE DISPENSING AND REDEEMING OF VOUCHERS BY VOICEMAIL

FIELD AND BACKGROUND OF THE INVENTION

1. Field of the Invention

The present invention relates to an electronic commerce enabling system, and in particular to a system that provides voucher dispensing and redeeming by voicemail.

2. Description of the Related Art

Mobile network operators are seeking to provide more and more services through the existing mobile network. A commonly discussed application is mobile-commerce (hereinafter referred to as, "m-commerce"), which refers to the use of the mobile phone as a tool for undertaking financial transactions, replacing or working in conjunction with another payment solutions, such as credit cards. A specific usage case in m-commerce is granting and redeeming vouchers, such as coupons, tickets, or proofs-of-purchase, via the mobile phone. However, voucher solutions that have been proposed so far require subscribers to master new and unfamiliar processes, or require modifications or new capabilities in the handsets or network. For instance, using the Infrared interface on the handset requires the subscriber to learn how to align the handset with an IR interface positioned on the relevant Point Of Sale (POS) and transmit/receive a voucher message.

An example of a current technology dealing with this field is Regisoft (http://www.regisoft.com/—RegiSoft Corp., 11 Penn Plaza, Fifth Floor, New York, N.Y. 10001, USA.). Regisoft provides e-Voucher and e-Coupon technology for e-Coupon and e-Voucher Dispensing. The Regisoft system enables vendors to design individual or bulk coupons easily on desktop computers, and distribute these coupons/vouchers, in text form, to consumers' Internet-enabled and cellular devices, such that the coupons are redeemable at web sites and brick-and-mortar locations. Accordingly, vendors may create promotional incentives and revenue generators for distribution via Internet-enabled and cellular devices. As such, a vendor may determine the overall policies of an e-Coupon, thereby transmitting direct value-added services to consumers' communications devices. The Regisoft service requires advanced capabilities in the handset, which may not be available, requiring the subscriber perhaps to purchase a new handset, and which require the subscriber to learn new facilities and new methods of interaction. These capabilities, or other new capabilities, are required in order to supply a framework for handling the two-way interaction between the subscriber and the voucher system. Furthermore, this service is not based on processes familiar to subscribers, therefore it requires significant education and training. For example, when using IR, the user is required to learn how to point the handset at an IR device at the POS and operate some sequence of commands in order to send the voucher.

There is thus a widely recognized need for, and it would be highly advantageous to have, a system that can enable the user friendly creation, distribution and usage of digital coupons and vouchers, in both text and multimedia formats using existing standards of cellular phone hardware and software, and of mobile communications infrastructure.

There is a further need for a system that would enable cellular phone users to utilize the voice capability of their devices to activate mobile-commerce activities and transactions.

SUMMARY OF THE INVENTION

According to the present invention there is provided a system and method for voucher dispensing and redeeming using current voicemail systems and architecture. The present invention provides a solution for the limitations in the existing systems and services, by providing a system that allows for the reception and usage of theses vouchers using existing mobile communications hardware and infrastructure in a user-friendly way.

The present invention refers to the following terms and phrases:

VM—Voicemail is a service that allows subscribers to send and receive voice messages towards other subscribers or machine-run applications. The voice messages are physically stored as digitized voice messages on disk or flash memory. Advanced voicemail systems allow messaging features similar to the well-known e-mail service—features such as Reply, Forward, and Attachments.

VS—Voucher Server, which refers to a specialized server for optionally creating, storing, processing, verifying and monitoring vouchers.

POS—Point of Sale system, which refers to any computer system at any point of sale, online or offline, that is capable of receving and processing requests for voucher redemption.

MS—Messaging Server, refers to a server for serving vouchers and messages to users and POSs.

Voucher—Any form of vendor selling/marketing/product usage tools designed to encourage buying or usage of products or services (hereinafter referred to as "items") in the mobile commerce and e-commerce fields, such as e-vouchers, e-coupons and e-tickets.

According to one aspect of the present invention, a vendor issues a voucher to a user via the Voucher Server (hereinafter referred to as "VS"). The voucher identifies an item (a product or service) to be provided, optionally the user entitled to redeem it, optionally the extent of discount provided, and any other aspects relating to the voucher behavior/policies. The voucher is assigned a unique ID. The VS creates and sends a voicemail message to the subscriber. The message, in effect, embodies the voucher, such that the user hears an introductory message related to the voucher. This introduction informs the user about the voucher, from which the user may link to the actual voucher contents on the VS. The link to and identity of the voucher is thereby stored on the user's mobile device until utilized or deleted.

In an alternative embodiment of the voucher, the voucher is an attachment to the voicemail, such that the user receiving the voucher does not actually hear anything. The user receives some indication (like an icon) that there is a new message, and like regular voicemail messages, may navigate to the message, and link to the message content on the VS, where the actual voucher data is stored.

In order to redeem the voucher at a Point Of Sale system (hereinafter referred to as "POS"), the user forwards the voicemail voucher message (which contains the voucher) to the VS, with a telephone number, or other form of communications address associated with the POS. Each POS, such as a cashier in a shop, has a unique number or address, which is sent to the VS along with the voucher. All addresses associated with various POSs for this purpose are stored at the VS, and the specific address or number used identifies a particular POS. The VS extracts the voucher from the message, whether through Automatic Speech Recognition (ASR), DTMF decoding or opening and reading texts. The VS checks the voucher against the voucher conditions and rules in the VS (which were configured at the time of the voucher creation), and confirms its validity, optionally additionally checking if the particular user is entitled to redeem the voucher. If valid, confirmation is sent to the POS, via direct IP connection (such as HTTP, or e-mail). The VS then optionally invalidates the voucher to prevent repeat use. The invalidation procedure includes marking the voucher as "invalid" by filling in the appropriate field in the voucher database. Optionally, the VS informs the user about this invalidation in the form of a voice/text message. The user may subsequently delete the voucher from the mobile device memory.

The advantages of the present invention over the known systems include:

i. VM vouchers enable the dispensing of vouchers while using an existing and familiar messaging technique, not requiring techniques that are new and unfamiliar to users.

ii. The present invention provides an end-to-end voucher receive and redeem system, based on the existing voicemail infrastructure.

iii. Using basic voice capabilities of any standard voice handset, and any existing POS infrastructure Typical POSs have various applications for receiving real-life coupons, discounts, and various and marketing promotions and sales. The VS system hooks into these applications, and thereby the user communicates with the VS, which uses current POS infrastructure to process mobile, digital vouchers. Moreover, such vouchers may be stored on the VS in a text, audio or alternative multimedia format, depending on the VS software and system being used, and depending on the capabilities of the mobile devices to interact with the various message types. The present invention utilizes standard mobile communications architecture in the sense that it requires no modifications like an IR port, and the back-end systems handle the transaction, without any special capabilities (such as IR or Bluetooth).

In one preferred embodiment of the present invention, a system comprises:

i. a handset for receiving and redeeming vouchers;

ii. a Voucher Server for issuing vouchers and enabling the redemption of the vouchers; and iii. a Messaging Server for relaying the vouchers between the Voucher Server and the handset, and for relaying confirmations/messages between the VS and the POS;

iv. A Point Of Sale system (POS) for processing the voucher-based transactions, and providing the item indicated by the voucher.

v. Optionally, an Automatic Speech Recognition (ASR) engine and/or DTMF decoding engine for extracting the voucher from a voicemail message.

According to an additional embodiment of the present invention, a method is provided for automatically extracting vouchers from pictures, music and/or alternative multimedia messages.

BRIEF DESCRIPTION OF THE DRAWINGS

The invention is herein described, by way of example only, with reference to the accompanying drawings, wherein.

DESCRIPTION OF THE PREFERRED EMBODIMENT

The present invention relates to a system and method for providing voucher dispensing and redeeming using standard mobile communications devices and infrastructure. Specifically, the present invention can be used to provide a solution that allows for the reception and usage of vouchers using existing voicemail facilities and features, such that the content and authentication data of a voucher may be received, redeemed, verified and controlled based on conventional voicemail technology.

The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
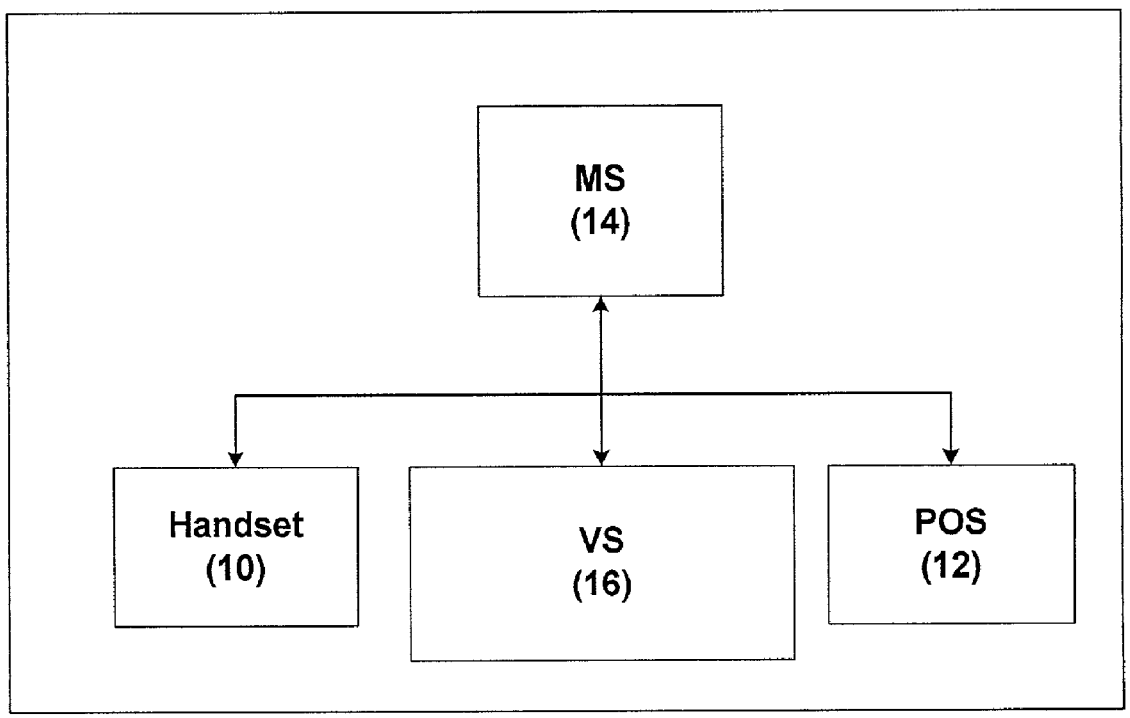
FIG. 1 is a block diagram illustrating one embodiment of the present invention.

The principles and operation of a system and a method according to the present invention may be better understood with reference to the drawings and the accompanying description, it being understood that these drawings are given for illustrative purposes only and are not meant to be limiting, wherein:

FIG. 1 illustrates the components according to one embodiment of the present invention, as follows:

i. A handset 10 for receiving and redeeming vouchers. The handset may be any mobile computing or communications device that can utilize voicemail technology, such as cellular phone, PDA, smart phone, mobile computer, notebook, PC and any other communications gadget, appliance or device.

ii. A Voucher Server (VS) 16 for issuing vouchers and enabling the redemption of the vouchers. This server stores the voucher, POS and user data, processes requests and serves data to users and subscribers over a network.

iii. A Messaging Server (MS) 14 for relaying the vouchers and messages between the Voucher Server and the handset, and the VS and the POS. The MS may optionally be part of the VS.

iv. A Point Of Sale system (POS) 12 for processing the transactions, accepting redemption of vouchers and providing the item indicated by the voucher. The POS may be any type of system, including physical or online purchase points, with a computer system for enabling voucher data receipt and processing. The POS is therefore a specific location where a user makes a purchase, i.e. a specific cash register. The user interfaces with the VS, which interfaces with the POS, in order to ensure multiple verification, of the user, the voucher and the POS.

v. Optionally, an Automatic Speech Recognition (ASR) engine and/or DTMF decoding engine is used by the VS for extracting the voucher from a voicemail message. Such engines may be located inside or outside the MS 14.

Figure 2:
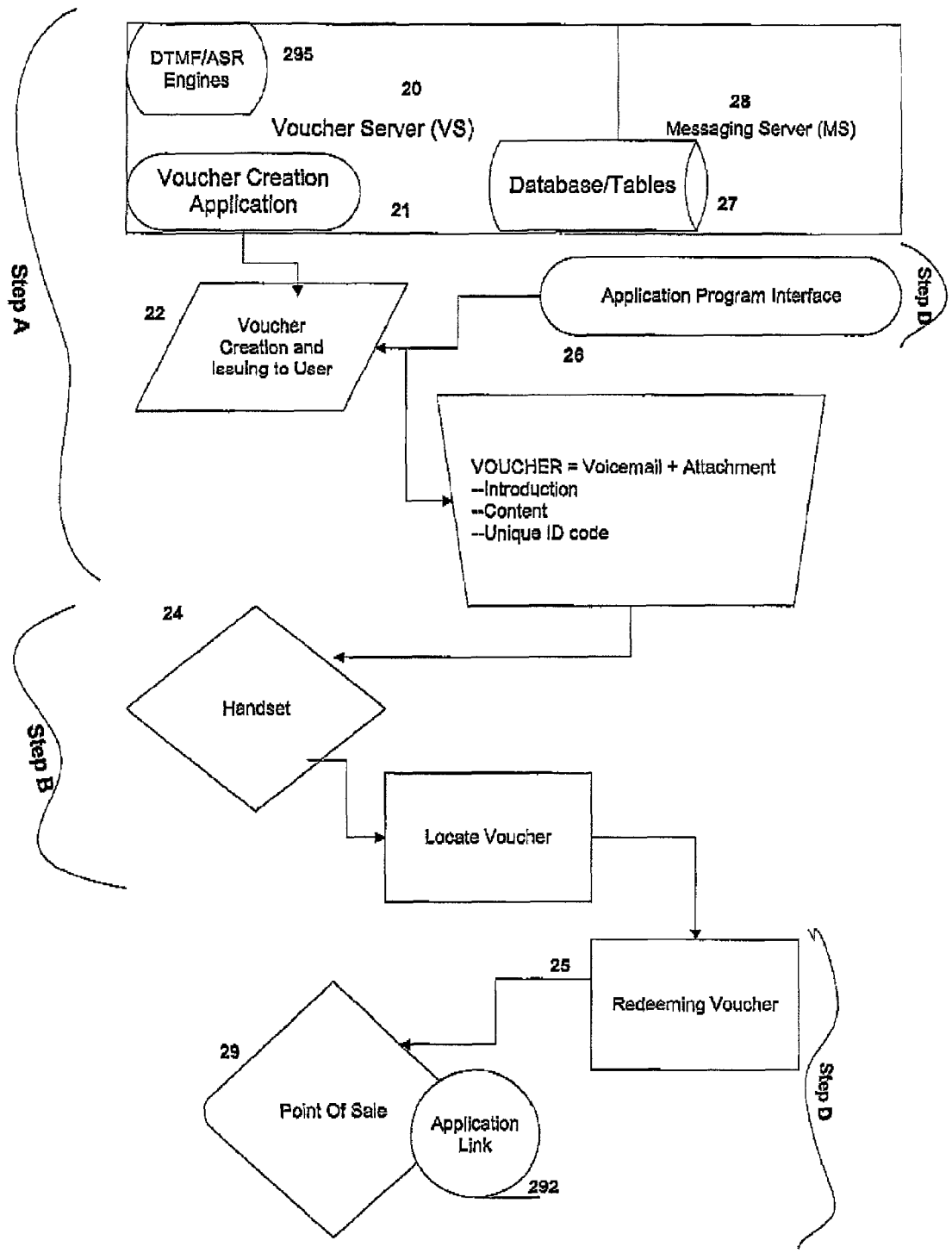
FIG. 2 is a flow chart illustrating the software flow as to how the voucher is created, distributed and redeemed.

The Block Diagram in FIG. 2 also provides an illustration of the operational flow according to the present invention. As can be seen in the figure:

a. The vouchers are created and issued 22 on the Voucher Server 20. A voucher creation application 21 is an interface that allows a system operator to create vouchers (which are essentially database records) in the form of voicemail messages with text or multimedia attachments, and enter them into the system. This application simply allows an operator to register a new item or record in the voucher database. The voucher is an item describing a product, the discount, the user who can use it etc. The voucher may be in the form of a voice, text or multimedia message, buy it is typically a simple message that can be rapidly disseminated, displayed and redeemed by a mobile communications device. An example of such an interface, that accepts a voice record, an address of the recipient, and a text attachment, and creates the required voicemail message as a combination of these various data elements, is the Trilogue Infinity software from Comverse Network Systems (Comverse Network Systems: 29 Habarzel Street, Tel Aviv 69710, Israel). Such a tool has an open interface that enables the expansion of simple voicemail messages to voicemail plus attachment messages. Such an application, furthermore, may provide options for the system operator to determine the content of the voucher (the voice/text/multimedia message), the identity, deadline, conditions, eligibility requirements, verification codes etc. The creation and further configuration of vouchers can therefore also be carried out using conventional tools that enable the creation of fields and entering of data, similar to the case of a computerized address book. Such a configuration is known in the art, such as that utilized by Regisoft Inc.

A typical voucher message may include, for example:

Voice portion: "You have received a coupon for a $5 discount on a new bicycle helmet at Sears. In order to use this coupon, please forward this voice message to the VS together with the address displayed on the cash register at Sears."

Hidden text attachment: Includes the unique voucher ID, e.g. 3543524564565.

An introduction portion (advertisement to the user notifying the user of the voucher message). This may include a voice message summarizing the voucher content/benefit, which is sent as the actual voicemail, to entice the user to open up the attachment or a name which identifies the type of voucher, e.g. coke 5%.

the voucher content itself, which is a voice message. This may include a description of the service or item being referred to in the voucher, the type of voucher (such as a full/partial funded voucher), ID of the beneficiary, ID of the voucher provider, voucher time limit, and any other conditions that are relevant for determining the value, usage and policies of the voucher; and a unique voucher ID code assigned to the particular copy of the particular kind of voucher.

Optionally, the voucher creator may stipulate that a voucher can be redeemed at particular POS's only, such as "at all Sears branches", where each till is a POS and is given a unique POS number. In this way, when a user enters the POS number in a voucher redemption procedure, the VS recognizes that the POS is authentic.

Additionally or alternatively, an Application Program Interface 26 (hereinafter referred to as "API") is provided that allows voucher creators to create vouchers using external applications that can be developed to handle the process of creating a new vouchers such that the vouchers will be compatible with the system of the present invention. These applications are designed to interact with the VS system using the API, as though these applications were an integral part of the system. Subsequently the API enables voucher vendors to register vouchers with the system. The vouchers, which have been entered into the system, are stored on a database or in a simple table 27 (which may be connected to the VS 20 or may be part of the VS 20) that lists the vouchers and the voucher data. The database also stores for each voucher an identity (hereinafter referred to as "ID"), the service it represents, optionally the discount, optionally the name of the recipient, and other rules relating to the redemption options. Management software allows managing, monitoring and updating of the vouchers stored in the database. Alternatively, an additional API may be enabled to execute commands and queries such as create voucher, delete, update etc. Such an API may also provide access to external applications, to do soothe managing, monitoring and updating.

The above described voucher creation application and API's enable the vouchers to be distributed and managed using conventional voicemail systems. The vouchers are distributed and managed similarly to any regular voice message, utilizing the same facilities for storing, forwarding, deleting etc. Vouchers that are created integrally with the voice message (as attachments), are sent to the handset as voice messages by the MS 28. In this sense, the link to the actual voucher content is in the voicemail message, and like voicemail messages, is the actual message is stored on the voicemail system, in the subscribers mailbox. Therefore the voucher appears to be unlike voicemail, since voicemail generally LINKS the user to the voicemail providers messaging server and database to retrieve and play the message, yet the voucher adds some intrinsic content to the voice message, besides the link. This Messaging Server 28 is a conventional voicemail server used to transfer voice messages between subscribers, such that active sending and receiving of voice messages is enabled. In addition, the Messaging Server 28 also used to send confirmation/disablement messages etc. to the POS.

b. A user receives and redeems vouchers using a handset 24. This handset may be any type of communications device, including a PDA, smart phone, PC, mobile computer, cellular phone etc. The relevant handset does not require additional hardware or software components in order to utilize the vouchers, but processes them according to the available handset facilities. For example, similarly to receiving a voicemail message, the user may receive a voicemail with a voucher attachment. This may be indicated by some sign or icon (which is actually a link to the voice message, which in turn links to the voucher on the VS) on the device when a voicemail voucher has been received. The user can subsequently open the voicemail message, which links the user to the VS database, from where the VS retrieves the actual voucher content, which is played or otherwise displayed to the user. Upon forwarding the message to the VS, (using the address displayed on the POS), the VS links the voucher ID to the voucher in the voucher database, in order to identify and verify the voucher.

c. The voucher, once stored on the user device, may be used or redeemed 25 on demand. For example, if the user has a voucher for a free coke, and wants to redeem it at a particular shop, he/she simply attains the POS number, which should be displayed in the POS vicinity, locates the voucher (icon/number) on the device, forwards the voucher link together with the POS number to the VS. The VS verifies both the user and POS, and if authentic, passes a message (phone call/voicemail/SMS/email/IM) to the POS and optionally the user as well, to give confirmation to process the transaction. Optionally, the VS includes the voucher details in the message sent to the POS.

d. The Point Of Sale system (POS) 29 accepts redemption, and optionally additional payment, and provides the item indicated by the voucher. The POS 29 requires the addition of an interface, such as an application link 292, to allow it to receive notification of vouchers from an external system. This link is typically based on simple IP, such as HTTP or e-mail. No advanced IR or other new physical media are necessary. Such application links exist in today's modern POS systems in order to allow the POS to accept marketing promotions, sales, and other coupons etc., in order to facilitate voucher redemption. Such an interface may be configured, for example, to receive a payment notification (or partial) from the VS 20 including some transaction ID. The payment notification being referred to here may be an instruction to execute the voucher's function, such as paying for the product. The transaction ID is typically used at this stage for management and logging etc. This interface, furthermore, accepts the payment (or partial) of the identified transaction from the voucher. The POS may optionally receive vouchers from the VS on a private line, for additional security.

e. Optionally, there is Dual Tone Multi-Frequency (DTMF) decoding machine and/or an Automatic Speech Recognition (ASR) module 295 for extracting the vouchers from the relevant messages/files. Such engines/machines are external software packages that are connected to the VS 20. For example, existing Interactive Voice Response (IVR) systems, such as the "Progeny" series from Comverse Network Systems (Comverse Network Systems: 29 Habarzel Street, Tel Aviv 69710, Israel), can be used to decode and execute DTMF based commands. An example of appropriate speech recognition software is the Lernout & Hauspie speech recognition engine (Lernout & Hauspie N. V., 52 Third Avenue, Burlington, Mass. 01803).

Figure 3:
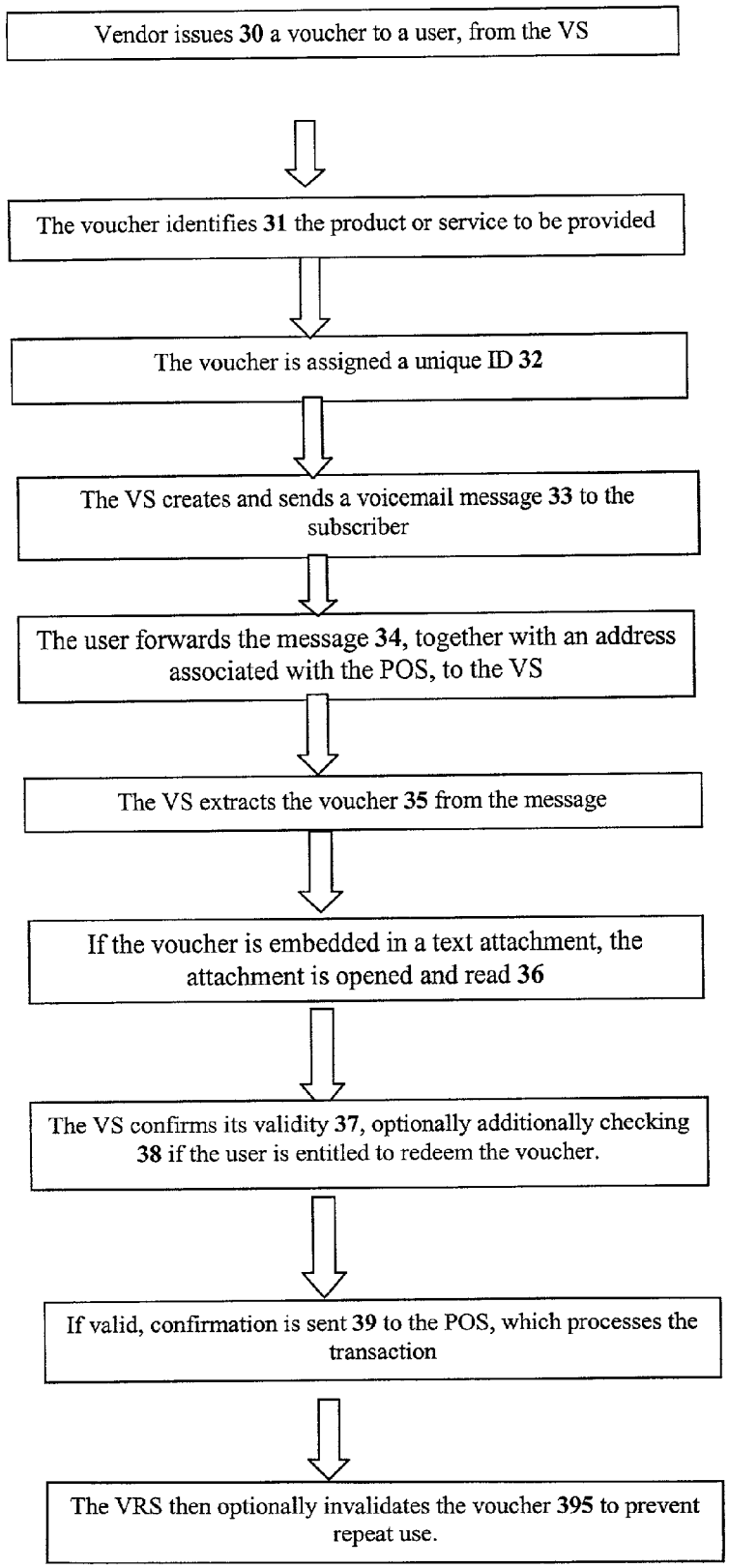
FIG. 3 is a flow chart illustrating processes for executing a voucher dispensing and retrieving procedure, according to one embodiment of the present invention.

The Process, according to one embodiment of the present invention can be seen in operations 30-40 of FIG. 3:

i. In operation 30, a vendor issues a voucher to a user, via the VS 16. This refers to initial preparation of a voucher for a user, including constructing the voucher in the VS.

ii. The voucher is identified at operation 31, as an item, such as a product or service, to be provided, optionally the user entitled to redeem it, optionally the extent of discount provided, and any other aspects relating to the voucher behavior/policies.

iii. The voucher is assigned, at operation 32, a unique ID, for identifying the voucher and for use upon redemption. The ID code may be an integral part of the voice message (e.g., spoken words or DTMF) or multimedia message (e.g., text or picture). The ID code is invisible to the user, yet it is stored on the voicemail system together with the voucher. The ID is integrated into a message at the time the voice message is sent. The ID may be assigned using a simple sequential ID, or any other chosen method. The ID may optionally contain some internal checksum element to reduce fraud and/or transmission errors.

iv. The VS 16 sends the voicemail message (optionally with at least one attachment) to the subscriber, via the MS 14 at operation 33. The message in effect embodies the voucher, and the accompanying code (ID). In a particular embodiment, wherein only voice is used, the voucher is encoded as a DTMF sequence or as a voice sequence e.g. "One Three Four Five . . . " Which is decoded by the VS when receiving the voucher, upon redemption.

In an alternative embodiment, if the MS 14 supports messages with attachments, the vouchers can be "hidden" as an attachment to the message, so that vouchers sent to subscribers are actually voice messages indicating the presence of a voucher, such that the subscriber does not hear the voucher automatically, but is required to open the attachment (ie. link to the VS to do this) to hear or view the voucher. This requires voucher creation facilities that enable the attachment of data to a voice message, such that a receiving subscriber remains unaware of the attachment, but the messaging system can access it. The subscriber can then store this link to a voucher, or a plurality of vouchers, on his/her mobile communications device. In this way, the subscriber has a convenient way of using his/her mobile communications device in a store or any other place in order to store and redeem vouchers.

v. In order to redeem the voucher at the POS 12, the user forwards the message (which contains the voucher) to the VS, and adds to the message a communications address (such as a telephone number, email address, instant messaging, SMS, Facsimile, chat, pager address etc.) associated with the POS, as indicated on the POS, at operation 34. This forwarding may be achieved through using any of the command means operable by the device being used, such as speaking, typing and clicking the relevant data required for the forwarding procedure. The message may be transmitted by wireline or wireless transmission, depending on the device being used.

vi. The VS 16 extracts the voucher from the message at operation 35: If the voucher was embodied in audio format, the VS performs Automatic Speech Recognition (ASR) or Dual-Tone Multi-frequency (DTMF) decoding in order to extract the voucher, using the appropriate engines/software.

vii. If the voucher is embedded in a text attachment to a voice message, the attachment is opened and read by the VS 16 at operation 36. Therefore the voice messaging system is used to identify and transfer a voucher to a user. Current advanced voicemail systems, such as those of Comverse Network Systems, have the ability to recognize and read such voice attachments.

viii. The VS 16 confirms the validity of the voucher, according to pre-configured rules stored on the VS database at operation 37. Optionally, the VS 16 additionally checks if the user is entitled to redeem the voucher at operation 38. This may be necessary, for example, in the case where one subscriber forwarded the voucher to another subscriber.

ix. If valid, confirmation is sent from the VS 16 to the POS 12, at operation 39, typically via an IP link (such as email).

x. The VS 16 then optionally invalidates the voucher in order to prevent repeat use at operation 395. This is achieved by canceling the relevant voucher on the VS 16, so that the next time permission is requested to redeem the voucher, it will be refused.

It should be noted that the user is required to redeem a voucher at the POS, whether a physical POS or online. The POS is required to verify any voucher redemption with the VS, such that only valid vouchers will be affirmed. In the case of an expired or otherwise invalid voucher, the voucher will be invalidated and removed by the VS, and subsequent verification requests from a POS will time out and will be aborted.

A specific example describing the complete process according to the present invention is the case of a vendor who wants to send a known customer a voucher (e.g., coupon) that gives the customer $5 off the latest "Destiny's Child" album if the voucher is redeemed within the next 2 days. Such an example is actualized in the following steps:

i. The voucher is created in the VS or external API, which includes the voucher unique ID, introduction, content and conditions etc. The introduction is "You have a new coupon for $5 off a purchase of any Destiny's Child album at any Barnes&Noble bookstore". The content/conditions may include, for example, providing a $5 discount that expires in 2 days.

ii. The voucher is sent as a voicemail message to the user handset, using the Messaging Server, such that the voicemail message has an attachment, wherein is stored the full contentts of the voucher, or a link to the actual voucher contents. The attachment may embody the voucher in audio, textual or alternative multimedia format.

iii. The user receives the voicemail message, whereby the presence of the message may be indicated by an icon/text. The user opens the message and reads, listens or views it.

iv. When the user arrives at a relevant POS where the item can be purchased, he/she forwards the entire message/voucher to the VS, including with the voucher the address that is indicated on the cashier/generic computer/device/line of the POS (that identifies the POS). The VS opens up the voucher, reads the contents, verfies the voucher, user and POS, and sends a confirmation to the POS via an IP link such as HTTP or email. Once the POS receives the verification, it can process the voucher and proceed with the transaction. Subsequently the VS cancels the particular voucher used (unique ID of particular copy of particular kind of voucher), such that future attempts to verify usage would be ignored or rejected by the VS.

The foregoing description of the embodiments and processes of the present invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. A system for enabling the usage of voicemail to distribute and redeem vouchers, comprising:
   i. a Voucher Server for enabling distribution and redemption of voicemail vouchers;
   ii. a Handset for interacting with the vouchers from said Voucher Server and receiving a voicemail voucher link from said Server, wherein the voicemail voucher link is related to a voicemail voucher;
   iii. a Point Of Sale system (POS) for accepting redemption of said voicemail vouchers, wherein a user redeems the voicemail voucher by forwarding using the handset the voicemail voucher link to the Voucher Server with information identifying the POS, so that the Voucher Server sends the voicemail voucher to the appropriate POS for redemption of the voicemail voucher.

2. The system of claim 1, wherein said Voucher Server further includes an Application Program Interface for enabling usage of at least one voucher from at least one external application.

3. The system of claim 1, wherein said Voucher Server comprises:
   a. a Voucher Application for creating and managing said voucher; and
   b. a Messaging Application for delivering said voucher to said handset and for delivering messages to said POS.

4. The system of claim 2, wherein said Voucher Server further comprises an Automatic Speech Recognition (ASR) engine for extracting the voucher from an audio message.

5. The system of claim 2, wherein said Voucher Server further comprises a dual tone multi-frequency (DTMF) decoding engine for extracting the voucher from an audio message.

6. The system of claim 2, wherein said Voucher Server further includes a voucher creation application for creating at least one voucher that is compatible to the system.

7. The system of claim 2, wherein said Voucher Server is operative to manage the vouchers by determining voucher characteristics selected from the group consisting of voucher content, beneficiary identity, voucher type, voucher vendor details, voucher deadline, voucher conditions, voucher eligibility requirements and verification codes of a voucher.

8. The system of claim 1, wherein said Handset is selected from the group consisting of cellular phones, personal digital assistants (PDAs), smart phones, mobile computers, notebook computers, and personal computers.

* * * * *